Sept. 2, 1941.                B. GRUNDHALT                2,254,892
                                WIND MOTOR
                            Filed May 18, 1939           2 Sheets-Sheet 1
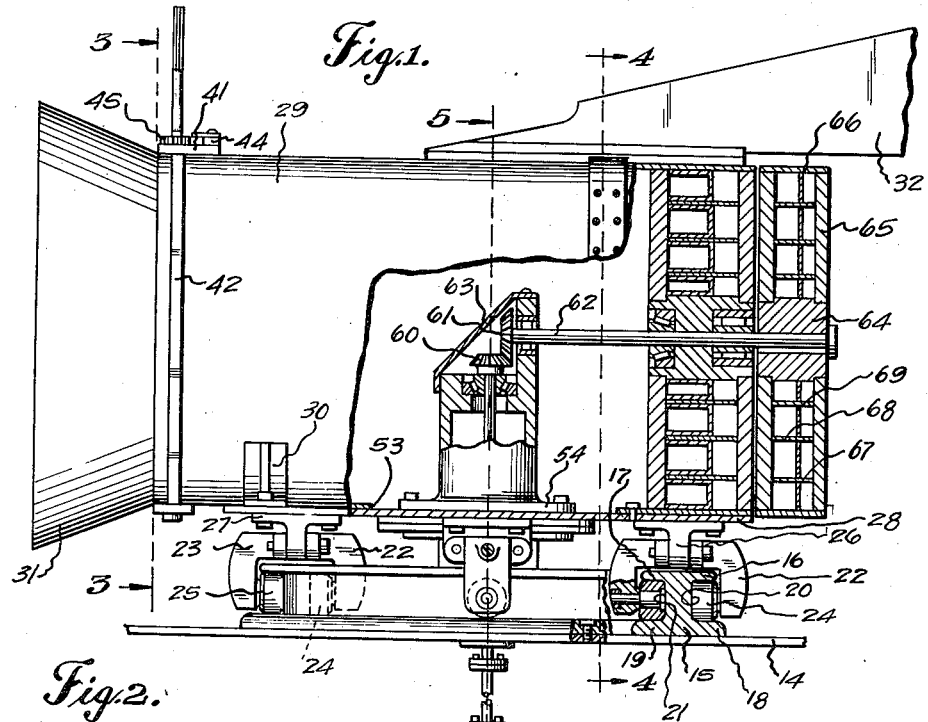
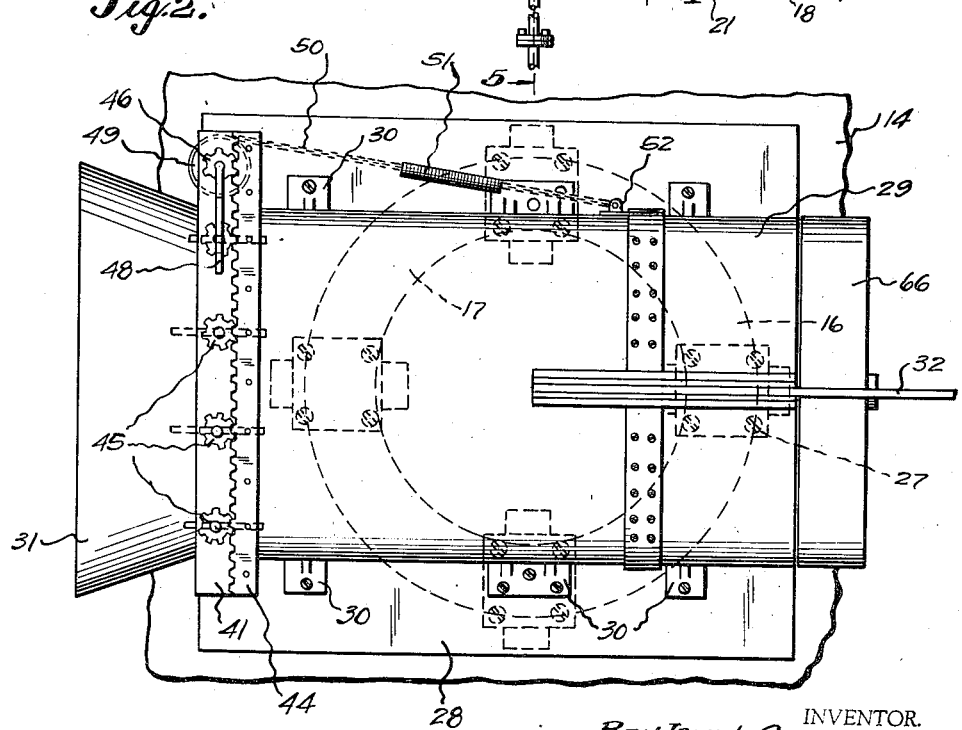
INVENTOR.
BENJAMIN GRUNDHALT.
BY
ATTORNEY.

Sept. 2, 1941.  B. GRUNDHALT  2,254,892
WIND MOTOR
Filed May 18, 1939  2 Sheets-Sheet 2
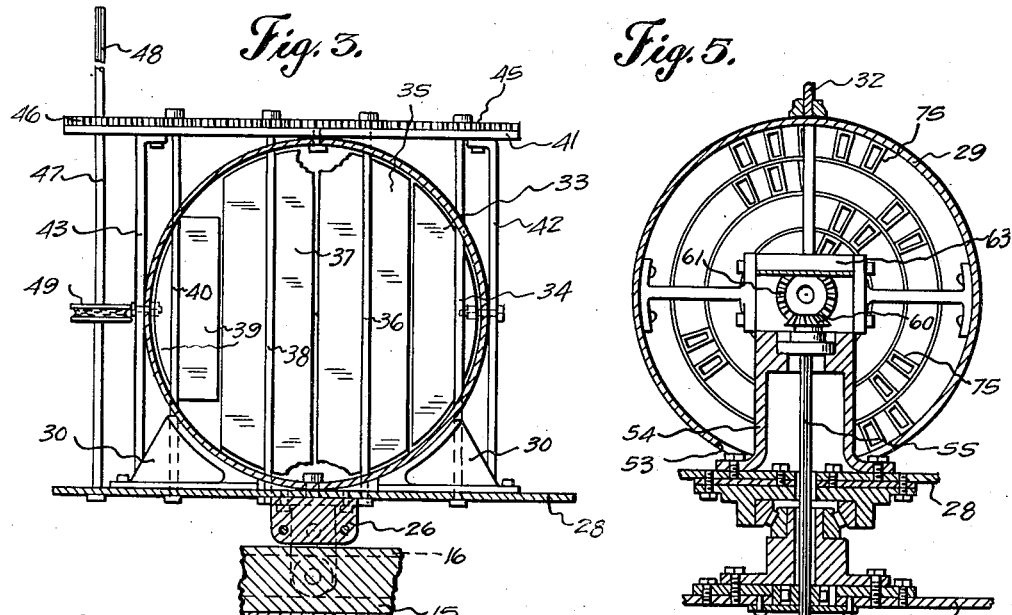
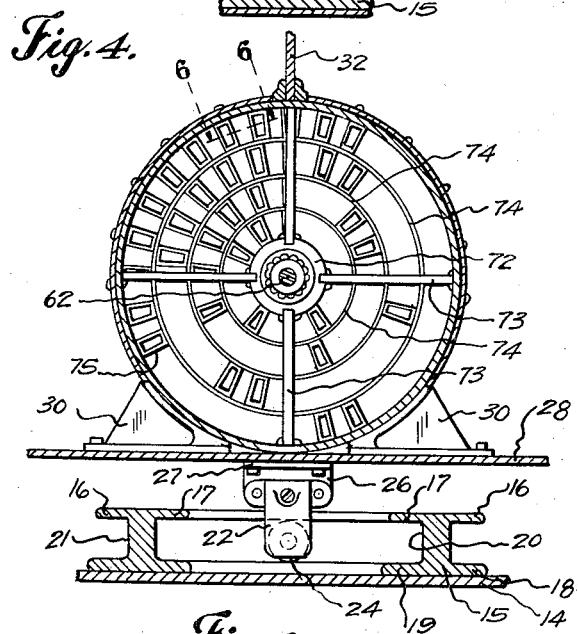
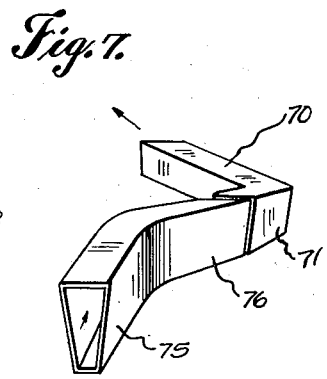
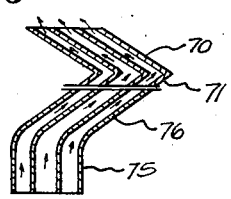
INVENTOR.
BENJAMIN GRUNDHALT.
BY Thos L Donnelly
ATTORNEY.

Patented Sept. 2, 1941

2,254,892

UNITED STATES PATENT OFFICE 2,254,892

WIND MOTOR

Benjamin Grundhalt, Detroit, Mich.

Application May 18, 1939, Serial No. 274,392

3 Claims. (Cl. 170—40)

My invention relates to a new and useful improvement in a wind operated motor. In wind operated motors, a common disadvantage or failing is that a great deal of the wind striking the driven parts is dissipated by being deflected in all directions. I am aware that various means have been resorted to for confining the wind which strikes the driven parts but in such devices, the driven parts do not afford sufficient hindrance to the passage of the wind to the confining means with a consequent loss of efficiency. It is an object of the present invention to provide a wind motor of this type in which the loss of power of the wind striking the driven parts will be reduced to a minimum.

Another object of the invention is the provision of a wind motor of this class which will be simple in structure, economical of manufacture, durable, compact and highly efficient in use.

Another object of the invention is the provision in a wind motor of the combination of a confining element, a deflecting element, and a driven or rotatable element so arranged and constructed that the wind within the confining element will be deflected against the rotatable element in such a manner as to produce maximum efficiency.

Another object of the invention is the provision of a confining element adapted for the reception of wind so arranged and constructed that the volume of wind may be regulated automatically with the velocity of the wind so as to prevent excessive speed of the wind driven or rotatable part.

Another object of the invention is the provision of a rotatable element having impingement members mounted therein so arranged and constructed as to effect a maximum rotation.

Another object of the invention is the provision of a novel, durable, highly efficient and compact mounting for the mechanism.

Other objects will appear hereinafter.

In the drawings, I have illustrated the preferred form of construction of the invention. It will appear obvious, however, from the description which follows, that various changes and modifications in the structure of the invention may be resorted to without departing from the spirit of the invention and it is my intention to embrace such variations and modifications within the claims which form a part hereof.

For the purposes of a clearer understanding of the invention, I have made a part of the specification drawings in which, Fig. 1 is a side elevational view of the invention with parts broken away and parts shown in section, Fig. 2 is a top plan view of the invention, Fig. 3 is a sectional view taken on line 3—3 of Fig. 1, Fig. 4 is a sectional view taken on line 4—4 of Fig. 1, Fig. 5 is a sectional view taken on line 5—5 of Fig. 1, Fig. 6 is a sectional view taken on line 6—6 of Fig. 4, Fig. 7 is a perspective view of the deflecting members used in the invention.

In the drawings I have illustrated a platform 14 which may be supported by any suitable supporting standards commonly used on wind machines of the wind mill type. Mounted on this platform 14 is a circular track embodying the central web 15, the upper lateral arms or flanges 16 and 17 and the lower lateral arms or flanges 18 and 19 to provide the channels 20 and 21 in which engage rollers 24 and 25 carried by the side plates 22 and 23 of a saddle. These side plates are secured to a depending lug 26 carried by the plate 27, which is fastened to a supporting plate 28. Secured on the plate 28 by means of the braces 30 is a wind tunnel or confining tunnel 29 having the flared or bell-shaped receiving end 31. A stationary plate 32 is mounted on the upper side of the cylindrical tunnel 29 and extended axially thereof to provide a vane which will operate to retain the bell-shaped end of the tunnel directed toward the wind, this tunnel rotating on the track.

Positioned in the tunnel 29 inwardly from the flared portion 31 is a plurality of swingable shutters which, when in closed position, will serve to substantially close the tunnel 29 and prevent passage of wind therethrough. The shutter 33 is fixed to and mounted on the rod 34. The shutter 35 is fixed to and mounted on the rod 36. The shutter 37 is fixed to and mounted on the rod 38. The shutter 39 is fixed to and mounted on the rod 40. These rods project through the cylindrical tunnel 29 and also through a blade 41 which serves as a journal for the rods, this blade 41 being secured in position by the braces 42 and 43 which project upwardly from the plate 28. On the upper end of each of the rods 34, 36, 38 and 40 is fixedly mounted a pinion 45 meshing with a rack bar 44 slidably positioned on the blade 41. This rack bar 44 also meshes with a pinion 46 fixedly mounted on the rod 47 which also projects through the blade 41 and extends upwardly from a bearing 47'. Fixedly mounted on the upper end of the shaft 47 is a vane blade 48. Fixedly mounted on the shaft 47 intermediate its ends is a pulley 49 to which one end of a chain 50 is attached, the opposite end thereof being secured to a spring 51 which is connected to the lug 52 mounted on the tunnel 29. The construction is such that upon a rotation of the shaft 47 a rack bar 44 will be moved longitudinally, thus effecting a rocking of each of the shafts 34, 36, 38 and 40 and moving their respective shutter blades to open and closed position, depending upon direction of rotation. The tension of the spring 51 is such that it normally maintains the shaft 47 rocked to position to retain the shutters in open position as shown in Fig. 2. It will be noted that the plate 48 extends transversely of the tunnel and when the velocity of the wind increases to a predetermined degree, the impact of the same against the plate or vane 48 will cause it to swing, thus rotating the shaft 47 against the tension of the spring 51 and rocking the shutters toward closing position. It is obvious that if the velocity should reach a predetermined degree so as to overcome the tension of the spring the shutters would be rocked to fully closed position. When this wind pressure would be relieved, the spring 51 would function to restore the shutters to open position. In this way, I have provided a means for limiting the volume of wind passing through the tunnel so as to automatically guard against excessive rotation of the rotatable member.

An opening 53 is formed in the bottom 29, this opening being covered by the plate 28. Mounted on the plate 28 at this opening is a bearing housing 54 which projects inwardly of the tunnel 29 diametrically thereof. Extending axially centrally of the bearing housing 54 is a shaft 55 which extends below the platform 14 and is connected by the coupling 56 to a shaft section 57 which in turn is connected by the coupling 58 to a shaft section 59, leading to the mechanism to be operated upon the rotation of the shaft 55. This shaft 55 carries at its upper end the bevel gear 60. Meshing with the bevel gear 61 fixedly mounted on the horizontally disposed shaft 62 which extends centrally axially of the tunnel 29, a cover 63 is mounted on the upper end of the housing 54 for enclosing the bevel gears.

Fixedly mounted on the end of the shaft 62 is a hub 64 radiating outwardly from which in fixed relation thereto are the ribs or bars 65 embracing the central bands or rings 66, 67, 68 and 69 which are arranged in concentric spaced relation to each other and secured to the ribs 65, these rings or bands being concentric to the shaft 62. Filling the space between adjacent bands or rings are wind conductors shown in perspective in Fig. 7 and in section in Fig. 6. These wind conductors embody the short angularly turned end 71 and the elongated angularly turned end 70, the wind entering through the end 71 and discharging through the end 70. The angularly formation is such that wind passing through these conductors would effect a rotation of the hub 64. It will be noted that the wind is thus confined and has definitely determined passages through which it must pass, thus increasing the efficiency of the mechanism by preventing undesirable travel of the wind after impingement against a flat surface which would be the case where the wind is not so confined.

Rotatably mounted on the shaft 62 is a hub 72 secured to which and radiating outwardly from which are the ribs or bars 73, which are secured to the spaced concentric rings 74. Positioned in the space between these rings are wind conductors embodying the portion 75 and 76, these portions being angularly turned toward each other. As shown, these conductors are tapered from their upper side to their lower side, the side walls extending on radii. In the spaces between the inner rings, a fewer number of these conductors would be positioned then in the space between the outer rings, these conductors being positioned apart sufficiently to provide between them substantially the same space or channel as there is through them. The wind passing through the tunnel 29 will enter the portion 75 of the conductors and then be deflected by the portion 76 from which the wind will pass outwardly. The wind passing from the portion 76 will pass into the portion 71 and effect a rotation of the rotor. Experience has shown conclusively that by deflecting the air by means of the conductor portions 75 and 76, a higher degree of efficiency is obtained and a more effective rotation of the rotor accomplished.

It is believed obvious that this apparatus might also be operated by high and low tide movements with its periodic changes of direction of flow. In such use the shaft 55, of course, would extend upwardly instead of downwardly.

What I claim as new is:

1. In a wind motor of the class described: a wind receiving tube; a stationary deflecting member positioned transversely in said tube intermediate its ends and substantially filling the same and comprising, a plurality of concentrically arranged bands; radially extending means for connecting said bands together; and a plurality of tubular members positioned between said bands in circumferentially spaced relation for providing wind channels, said tubular members being extended axially of said tube for a portion of their length and thence inclined to the axis thereof.

2. In a wind motor of the class described: a stationary deflecting member comprising, a plurality of concentrically arranged spaced bands; means for connecting said bands together and maintaining the same in spaced relation; a plurality of tubular members positioned between each of said bands and arranged in circumferentially spaced relation to each other for providing a plurality of wind passages, said tubular members being angularly turned intermediate their ends and extended axially of said bands for a portion of their length.

3. In a wind motor of the class described: a rotor comprising, a hub; a plurality of bands embracing said hub and arranged in concentric spaced relation; radially directed means secured to said hub and projecting outwardly and connecting said bands together and retaining the same in spaced relation; and a plurality of conduits positioned between adjacent bands in spaced relation to each other for providing air passages, said conduits being angularly turned intermediate their ends and extended axially of said bands, said conduits being spaced apart a distance to provide a space duplicating the space interior of said tubular members.

BENJAMIN GRUNDHALT.